United States Patent
Liao

(10) Patent No.: US 7,187,694 B1
(45) Date of Patent: Mar. 6, 2007

(54) GENERIC PACKET PARSER

(75) Inventor: Heng Liao, Burnaby (CA)

(73) Assignee: PMC-Sierra, Inc., Santa Clara, CA (US)

(*) Notice: Subject to any disclaimer, the term of this patent is extended or adjusted under 35 U.S.C. 154(b) by 971 days.

(21) Appl. No.: 10/113,797

(22) Filed: Mar. 29, 2002

(51) Int. Cl.
*H04J 3/24* (2006.01)

(52) U.S. Cl. .................................... 370/474

(58) Field of Classification Search ........ 370/254–256, 370/389, 392, 474, 476
See application file for complete search history.

(56) References Cited

U.S. PATENT DOCUMENTS

| | | | |
|---|---|---|---|
| 5,748,905 A * | 5/1998 | Hauser et al. .............. | 709/249 |
| 5,916,305 A | 6/1999 | Sikdar et al. | |
| 6,192,051 B1 | 2/2001 | Lipman et al. | |
| 6,320,848 B1 * | 11/2001 | Edwards et al. ............ | 370/255 |
| 6,343,368 B1 | 1/2002 | Lerzer | |
| 6,484,170 B2 * | 11/2002 | Abdat .......................... | 707/6 |
| 6,549,521 B1 * | 4/2003 | Edwards et al. ............ | 370/255 |
| 6,775,284 B1 * | 8/2004 | Calvignac et al. .......... | 370/392 |
| 6,904,057 B2 * | 6/2005 | Sarkinen et al. ............ | 370/469 |

* cited by examiner

*Primary Examiner*—Dmitry Levitan
(74) *Attorney, Agent, or Firm*—Townsend and Townsend and Crew LLP

(57) ABSTRACT

A packet parser performs a multitude of compare and transition operations to parse through all layers of the networking protocol in accordance with which the packet is formed. The packet parser supports a plurality of packet encapsulation formats and uses directed distance graph syntax for graphical representation. At each node, the packet parser isolates and compares a packet header word with either a number of associated masked values or a number of ranges to find a match. Depending on the match, one of the arcs originating from that node, namely a source node, is selected for transitioning to a destination node. A pointer is incremented as transition from the source node to the destination node is made. The packet parser is adapted to make a transition to a destination node from any number of source nodes, one or more of which may be a destination node for others of these source nodes.

6 Claims, 7 Drawing Sheets

GENERIC PACKET PARSER

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to packet communication networks, and more particularly to parsing of packets transmitted over a communication network.

A packet communication network typically includes a number of network devices, such as switches, routers, traffic controllers and traffic shapers that transmit, reroute or manage the flow of packets across the network. Each packet, in addition to data, also includes a number of control fields disposed in the packet's header. Such fields includes, for example, the source and destination address of the packet as well as the kind of operation that is required to be performed on the data disposed in the packet. Packets are often formed to comply with multi-layer network protocols that govern the flow and management of the packets across the many layers of such networks.

At the transmitting end, each layer of the network adds an associated header to the packet as the packets moves down from a higher layer to a lower layer. At the receiving end, each layer retrieves the header associated with that layer, performs the operations instructed by the header and, subsequently, forwards the packet to a higher layer. Accordingly, instructions regarding how a packet is to be processed by each layer of a multi-layer network is disposed in an associated packet header.

A packet is often parsed by a protocol parser in accordance with a set of predefined network protocols and rules that, in aggregate, define the encapsulation structure of the packet. The protocol parser generates information regarding the protocol type at each network layer, identifies the boundary—in byte offset—of the layers, and extracts such information as address and control fields that are required for processing of the packets at each layer of the network.

A prior art method of parsing packets includes using protocol discrimination software. Such software typically analyzes the various control fields disposed in the packet to identify the protocol in accordance with which the packet is formed. Thereafter, the packet is parsed in accordance with the classification rules and policies that define the protocol. The protocol discrimination software often processes the control and/or data field of a packet on a layer-by-layer basis.

A Central Processing Unit (CPU) often deployed to execute the codes of a protocol discrimination software is required to operate at clock frequencies that are typically an order of magnitude higher than that at which data disposed in the packet is received. In view of the ever increasing need for network bandwidth, such CPUs must operate at even faster rates. Consequently, a protocol discrimination software adapted to be executed by a CPU is often not a cost-effective packet parser.

To provide Quality of Service (QoS) and fine grain traffic management, emerging networking applications require a packet parser to handle a large number of customized network policies. Such customized policies typically need to operate on fixed-length as well as variable-length data fields disposed in a multitude of layer-associated packet headers which may also have complex dependencies. Protocol discrimination software, however, is typically adapted to handle a limited number of relatively simple classification rules. Furthermore, disadvantageously, an end user often does not have access to the software source code and therefore is unable to modify the source code. Such modification may be necessary to enable the software to recognize and parse packets formed in accordance with network protocols and policies other than those for which the software is originally customized.

To overcome some of the disadvantages of software discrimination protocols, hardware-based fixed protocol identifiers have been developed. The hardware in such fixed protocol identifiers includes a state machine that sequences through a predefined sequence of states to recognize and process encapsulation protocols, such as Internet Protocol (IP), Virtual Local Area Network (VLAN), and Sub Network Access protocol (SNAP) encoded Logical Link Control (LLC). The state-machine disposed in a fixed protocol identifier, however, is hard-wired and thus may not be reprogrammed to recognize and process packet header fields other those for which the state machine is hard-wired.

A programmable field detector is another example of a hardware-based packet parser. A programmable field detector typically includes a state machine that may be programmed to process a small number of customized classification rules and network protocols. However, the state machine in such a programmable field detector has a very limited degree of programmability and thus may not be programmed to recognize and process relatively larger number of classification rules and network protocols.

Another conventional method for protocol parsing involves the use of decision trees. Packet parsers that use decision trees are deployed in network processors or classifier devices, such as those available from Solidum Systems, located at 1575 Carling Avenue, Ottawa, Ontario, K1Z 7M3, Canada, or Agere Systems, located at 555 Union Boulevard, Allentown, Pa. 18109. In accordance with such methods, the rules and policies of supported protocols are defined and mapped to a decision tree. Each internal node of a decision tree defines one or more comparison operations, each represented by a branch (i.e., arc) leading to another node. Each leaf node (i.e., end node) defines a parsing result associated with a protocol type. To parse a packet, a decision tree is analyzed from its root to a leaf on a node-by-node basis. At each internal node, one or more compare and branch operations are performed to determine the next node in the parsing process.

A conventional multi-layer network typically supports a number of protocol formats for each layer. A decision-tree representation for such multi-layer networks may require a subtree associated with a supported protocol format to be replicated once for the higher layer and once for each of a number of lower layers each leading to a leaf node. Since the number of leaf nodes is equal to the product of the number of supported protocols and the number of layers disposed in these protocols, the decision tree suffers from the explosion problem.

FIGS. 1A and 1B show the multitude of nodes and branches of a prior art decision tree 10 representing an IP over Ethernet protocol. The Ethernet layer is shown as supporting packet formats Ethernet V3.0 802.3 SNAP encoded LLC, Ethernet V3.0 802.1p VLAN tagged frames and 802.3 SNAP encoded LLC VLAN tagged frames. Because the parsing subtree for the IP header is replicated for each of these level 2 frame formats, the IP subtree is repeated for four times. The repeated IP subtrees 12, 14, 16 and 18 are respectively associated with Ethernet V3.0, 802.3 SNAP encoded LLC, Ethernet V3.0 802.1p VLAN tagged frames, and 802.3 SNAP encoded LLC VLAN tagged frames. As seen from FIGS. 1A and 1B, as the tree depth increases to support more complicated and deeper protocol formats, the size of the tree increases exponentially. Furthermore, as seen from prior art FIGS. 1A and 1B, there are no paths (i.e., branches) between any two nodes originating from the same node. For example, there is no path between nodes VLAN and LLC, both of which originate from node Ethertype. Therefore, if a packet includes SNAP encoded LLC VLAN tagged frame, because there is no path between VLAN and LLC nodes originating from node Ethertype, a second LLC node originating from VLAN node is included in decision tree 10.

When parsing packets formed in accordance with a multilayer network, such as the seven layers associated with the Open Systems Interconnection (OSI) standard, the number of supported protocols may become large. Moreover, because of emerging network applications, many encapsulation protocols are being adapted to support recursive layering. For example, assume that an entity prefers to run an Layer 2 Tunneling Protocol (L2TP) tunnel for a Virtual Private Network (VPN) application across an Internet Protocol (IP) network—that is managed by an IP provider—then the L2TP tunnel is established between two of the entity's remote sites to carry across the Ethernet traffic. Therefore, the Layer Two traffic associated with the IP and the Layer One traffic associated with the Ethernet must be encapsulated in the L2TP layer. Therefore, the Ethernet and IP layers are recursive layers, as they appear once in Layers One and two, respectively, and again as they are encapsulated in the L2TP layer. To parse a packet adapted for such a network application using a decision-tree requires that Layers Two through Four be parsed twice, once after Layer One is parsed, and a second time after Layer Four is parsed.

As the number of recursive layers increases, any subtree representative of the protocol formats in a higher layer encapsulating a lower layer is replicated to include the end-to-end tree branches associated with the lower layer protocol. Hardware-based decision trees thus unnecessarily duplicate the compare and branch operations that are involved in parsing packets with recursive layers, and as such are inefficient. In other words, hardware-based decision trees are not easily scalable, are inefficient and are not adapted to meet the growing demand for supporting multilayer, complex and recursive network protocol layers.

BRIEF SUMMARY OF THE INVENTION

In accordance with the present invention, a packet parser isolates a packet header word at each decision node to carry out a plurality of compare operations. Depending on the result of the compare operations, one of the arcs (i.e., branches) originating from the node (i.e., source node) is selected for transitioning to a destination node. A pointer is incremented each time a transition from a source node to a destination node is made. The compare and branch operations are repeated until the packet parser parses through all layers of the networking protocol in accordance with which the packet is formed. The packet parser is adapted to make a transition to a destination node from, e.g., two source nodes which themselves may form a source/destination node pair. In other words, the packet parser is adapted to make, e.g., a transition from a first node to a second node, from a second node to a third node, and from the first node to the third node.

The packet parser (hereinafter referred to as parser) uses the directed distance graph (DDG) syntax for graphically representing its parsing operation. The parser—which supports a plurality of packet encapsulation formats—starts the parsing process by isolating the initial word of each packet at the start node of the DDG. The pointer pointing to this initial byte is assigned a value of 0 and is incremented as each word is isolated for compare and branch operations. At the start node, the isolated packet word is compared against one or more predefined values to find a match. Depending on the match, one of the nodes originating from the start node is transitioned to via an associated arc. Accordingly, each node of a DDG originates from the start node and is itself adapted to include a plurality of compare and branch operations. As the parser transitions from one parsing state to another parsing state, the pointer is incremented so as to always point to the next word to be isolated.

Each node has a number of associated arcs originating from that node. Furthermore, each such arc includes two associated numbers. The first number is that with which the word isolated at the arc's associated node is compared. The second number represents the distance—in words—between the two nodes separated by the arc. As the parser transitions from one node to another via the arc, the pointer is incremented by the count of the second number associated with that arc.

At each node, the word pointed to by the pointer is compared with each of the first numbers associated with the arcs originating from that node. The arc which includes the matching first number identifies the next transition and thus the next parsing state. If none of the arcs includes a number matching the isolated word, transition to a default node—indicating an unknown protocol—is made, and a flag is set. If multiple matches are found, the arc with the predefined highest priority is selected.

The second number associated with the arc containing the machining number defines the number of words that the pointer is to be incremented. The incremented pointer points to the packet word to be isolated for comparison at the next node. The parser implements the iterative parsing steps until an end node is reached. The parsing state associated with the reached end node represents the final layer of the packet format. The invention is more fully explained in connection with the accompanying drawings.

DETAILED DESCRIPTION OF THE INVENTION

Figure 1A:
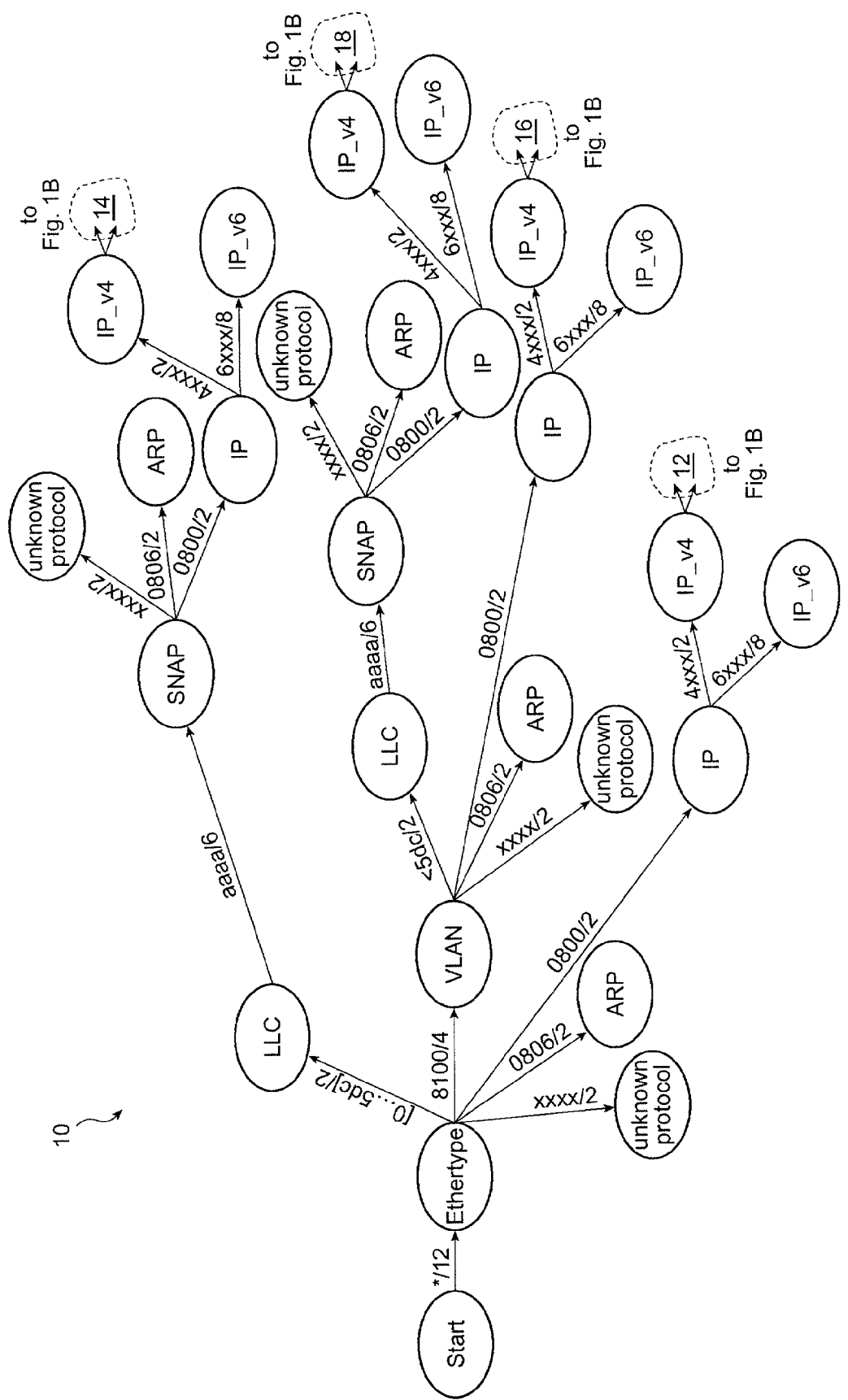
FIGS. 1A and 1B together form a decision tree showing the multitude of nodes and branches associated with a packet formed in accordance with an IP over Ethernet protocol, as known in the prior art.

According to the invention, a packet parser performs a plurality of compare and branch operations so as to parse through all layers of the networking protocol in accordance with which the packet is formed. The packet parser sequences through a number of parsing states, alternatively referred to in the following as decision nodes or nodes. At each such node, the packet parser isolates and compares a predefined portion of an associated packet header with one or more values or ranges. Depending on the result of the comparison operation, a transition to another node is made via one of a number of arcs originating from that node. Therefore, each arc originating from a node terminates at a different node and represents a different transition. A pointer disposed in the packet parser is incremented every time a transition from one node to another node is made so as to always point to the next packet header bytes to be parsed. The parsing process continues until all packet header bytes belonging to the protocol formats are accounted for.

The packet parser (hereinafter referred to as parser) uses directed distance graph (DDG) syntax for graphically representing its parsing operation. The parser—which supports a multitude of packet encapsulation formats—starts the parsing process by isolating the initial word (e.g., two bytes) of each packet header at the start node of the DDG. The pointer pointing to this initial byte is set to 0. At the start node, the isolated packet header word is compared against one or more predefined values to determine a match. Depending on the resulting match, transition to one of the nodes originating from the start node is made. Accordingly, each node of a DDG originates from the start node and represents a parsing state. As the parser isolates each packet word to determine the next parsing state, the pointer is incremented so as to always point to the next packet header word to be isolated for comparison.

Each node has a number of associated arcs originating from that node. Furthermore, each such arc includes two associated numbers—displayed above that arc in the DDG. The packet header word isolated at each node is compared with each of the first numbers associated with the arcs originating from that node. The arc which includes the matching first number identifies the next transition and thus the next parsing state. If none of the arcs include a number matching the isolated word, transition to a default node indicating an unknown protocol is made, and a flag is set. If multiple matches are found, the arc with the predefined highest priority is selected. The second number associated with each arc represents the distance—in byte offset—between the two nodes separated by the arc. Consequently, as the parser transitions from a source node to a destination node, the pointer is incremented by the count of the second number associated with the arc separating the source and destination nodes. The incremented pointer thus points to the next packet header word to be isolated for comparison at the destination node. The parser implements the iterative parsing steps until a node associated with the final layer of the packet format is reached.

Figure 2:
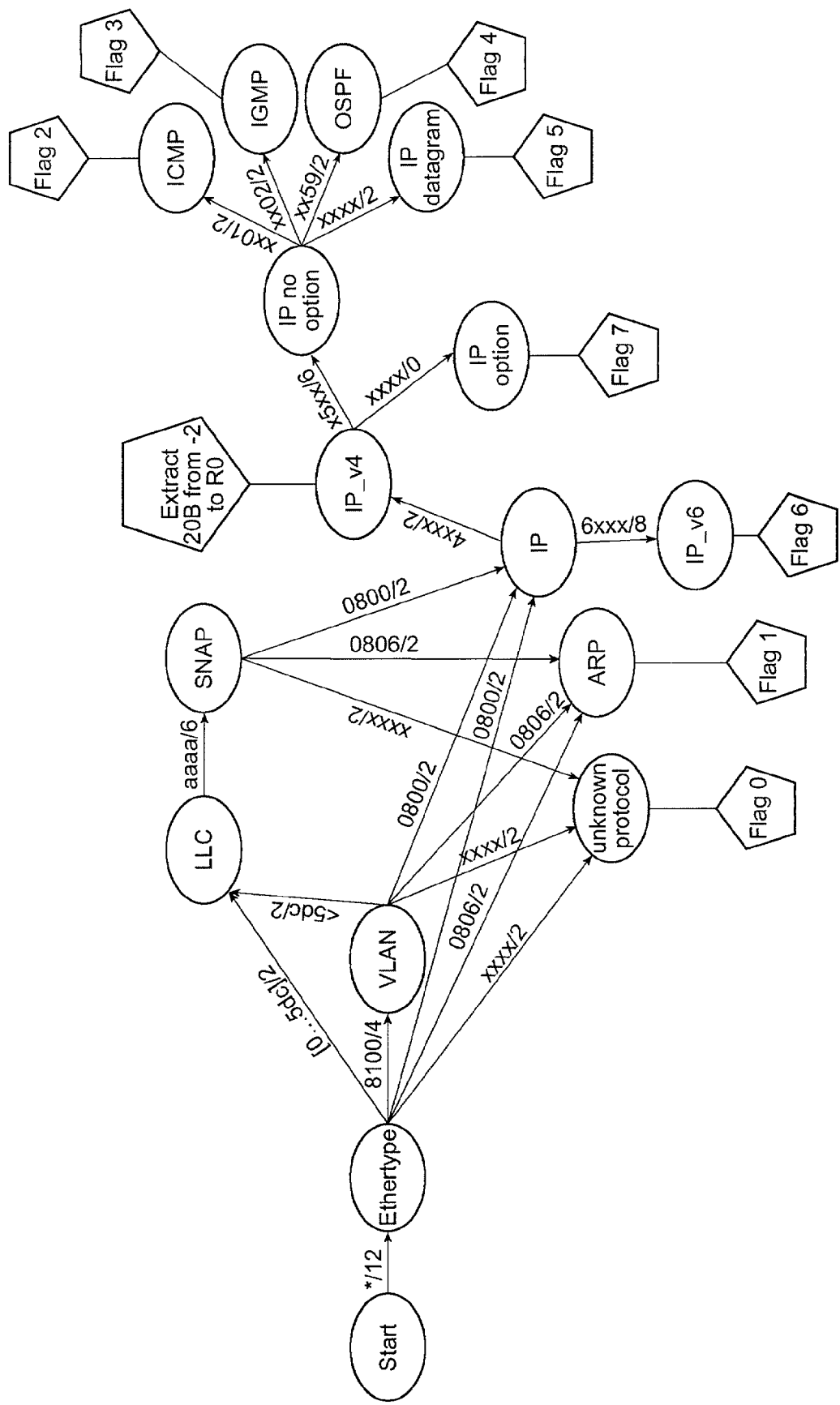
FIG. 2 is a directed distance graph of the transitions that a packet parser, in accordance with one embodiment of the present invention, is adapted to make when parsing a packet formed in accordance with an IP over Ethernet protocol.

FIG. 2 illustrates, by way of an example, the DDG nodes and arcs that the packet parser, in accordance with the present invention, sequences through as it parses packets associated with an Ethernet/IP/TCP protocol. Each node in FIG. 2 is shown by an oval with a name corresponding to the parsing state which that oval represents. The parser initiates the parsing process at Start node and terminates it after it reaches any of the end nodes Internet Control Message Protocol (ICMP), Internet Group Management Protocol (IGMP), Open Shortest Path First (OSPF) and IP datagram. Disposed between the Start and the End nodes are the internal nodes, each of which represents a different parsing state. Accordingly, in FIG. 2 the parsing process moves from left to right.

Associated with and displayed above each arc connecting one internal node to another internal node is a pair of numbers separated by a slash. The first number is compared with the packet word pointed by the pointer and thus isolated for comparison at the source node. The second number represents the number of bytes offset with which the pointer is incremented if and after transition to the destination node is made. If a compare operation does not lead to a node recognized and shown in FIG. 2, the parser moves to a default node, designated as unknown protocol.

The parser starts the parsing process at node Start after it receives the packet's header bytes. Next, the parser discards the first 12 bytes of the packet header which define such information as the source and destination address of the packet and which are not related to packet formation protocols. For this exemplary Ethernet/IP/TCP protocol, after discarding the initial 12 bytes, transition to node Ethertype is made. The pointer is advanced 12 bytes (e.g., 6 words) to point to the packet word that is isolated at and associated with node Ethertype, i.e., the packet word used for the comparison operations at node Ethertype. If the packet word associated with node Ethertype is between 0 and 5DC Hex, then node LLC forms the next parsing state as transition from node Ethertype to node LLC is made. If the packet word associated with node Ethertype is equal to 8100 Hex, then node VLAN forms the next parsing state as transition from node Ethertype to node LLC is made. If the packet word associated with node Ethertype is equal to 0806 Hex, then node ARP is transitioned to next. If the packet word associated with node Ethertype is not between 0 and 5DC Hex and is not equal either to 8100 Hex or 0806 Hex (this condition is shown in as xxxx) then the packet is not recognized as a conforming packet and is treated as belonging to an unknown protocol, and a flag, namely Flag0, is set.

If transition to node LLC is made, the pointer is incremented with two more bytes to point to the packet word used for the comparison operations at node LLC. If transition to node VLAN is made, the pointer is incremented with four more bytes to point to the packet word used for the comparison operation (i.e., the isolated word) at node VLAN. If transition to node ARP is made, the pointer is incremented with two more bytes to point to the packet word used for comparison at node ARP. If a packet conforming to an unknown protocol is received, transition to node unknown protocol is made and the pointer is incremented with two more bytes.

At node LLC, the packet word isolated for comparison at this node—as pointed to by the pointer—is compared with the value AAAA Hex to determine if the two match. If there is a match, the next parsing state is at node SNAP. Transition to node SNAP is accompanied by advancing the pointer by 6 bytes, thereby to point to the packet work isolated at node SNAP.

Four possible arcs originate from node VLAN. If the packet word isolated at node VLAN—as pointed to by the pointer—is smaller than 5DC Hex, transition from node VLAN to node LLC is made. If the packet word isolated at node VLAN is equal to 0800 Hex, transition from node VLAN to node IP is made. If the packet word isolated at node VLAN is equal to 0806 Hex, transition from node VLAN to node ARP is made. If the packet word isolated at node VLAN is not less than 5DC hex and is not equal either to 0800 Hex or 0806 (this condition is shown in as xxxx) then the packet is not recognized as a conforming packet and is treated as belonging to an unknown protocol, and flag Flag0 is set. Transitions from node VLAN to any of the nodes LLC, IP, ARP and unknown protocol involves incrementing the pointer by two more bytes.

Three possible arcs originate from node SNAP. If the packet word isolated at node SNAP—as pointed to by the pointer—is equal to 0800 Hex, transition from node SNAP to node IP is made. If the packet word isolated at node VLAN is equal to 0806 Hex, transition from node SNAP to node ARP is made. If the packet word isolated at node SNAP is not equal either to 0800 Hex or 0806 (this condition is shown in as xxxx) then the packet is not recognized as a conforming packet and is treated as belonging to an unknown protocol and flag Flag0 is set. Transitions from node SNAP to any of the nodes IP, ARP and unknown protocol involve incrementing the pointer two by more bytes. The remaining node transitions of FIG. 2 are understood in view of the above descriptions and in view of the designated nodes, arcs and the numbers associated with and displayed above each arc, and thus are not described below.

Figure 1B:
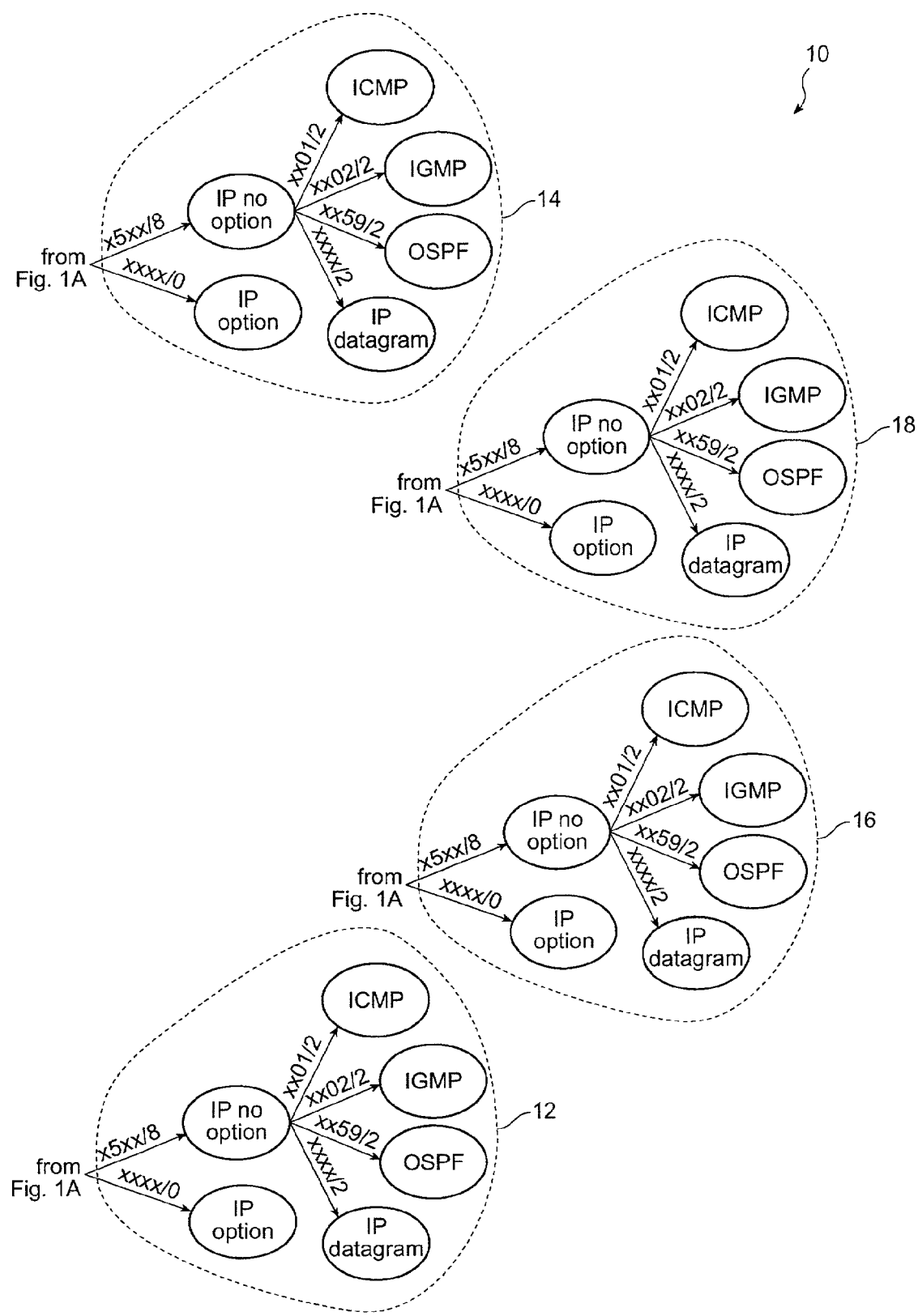

As seen from FIG. 2, in accordance with the present invention, transition may be made between, e.g., nodes Ethertype (e.g., a first node) and LLC (e.g., a second node), between, e.g., nodes Ethertype and VLAN (e.g., a third node), and between nodes LLC and VLAN. A packet parser in accordance with the present invention thus is adapted to make a transition from the first node to a second node, or form the second node to a third node, or from the first node to the third node nodes. Consequently, the packet parser of the present invention enables transitions that form a loop, such as the loop formed between nodes Ethertype, VLAN and LLC. This is in contrast with the prior art decision-tree based system shown in FIGS. 1A and 1B where no such loop is formed between any such three nodes. The loops, in accordance with the present invention, reduce the number of parsing operations. For example, the parser may reach the IP node directly from the VLAN node, or via nodes LLC, SNAP, or alternatively via nodes VLAN, LLC and SNAP. Therefore, advantageously in accordance with the present invention, node IP, as well as nodes originating from node IP, i.e., nodes IP_v4, IP_v6, IP_no-option, IP_option, ICMP, IGM, OSPF and IP_datagram, are included only once. This is in contrast with the prior art decision-tree based system shown in FIGS. 1A and 1B where node IP and the subtree originating from this node is repeated four times.

DDG Arc Record

As described above, associated with each arc is a comparison value and a distance representing the number of bytes offset from the current pointer position. Because most link layer protocols use 16-bit data, the packet parser processes 16 bits of data at a time. It is understood that in other embodiment, the packet parser may process more, e.g. 32, or fewer, e.g. 8, bits of data at a time. To further simplify the comparison operations, the packet parser, in accordance with the present invention, uses masked comparisons. For each masked comparison, the isolated 16-bit word is bitwise ANDed with an associated 16-bit mask before comparison. If a match is found, then the destination node pointed to by the matching arc is transitioned to and the pointer is incremented with the distance value associated with the matching arc.

Comparisons associated with some arcs require that the packet data be compared against a range of numbers, such as determining whether the data is greater or less than a number. In some embodiments of the present invention, each range comparison is divide into a number of masked comparisons (e.g., up to 15). The data structure of each arc record supported by the packet parser of the present invention is shown in Table I below:

TABLE I

| MASK[15:0] | VALUE[15:0] | NEXT_NODE[7:0] | DISTANCE[7:0] |
| --- | --- | --- | --- |

As seen from Table I, each arc record includes a 16-bit mask field, a 16-bit value field, an 8-bit next node field, and an 8-bit distance field. The 16-bit mask field is bitwise ANDed with the 16-bit value field to reduce the complexity of compare operation. The 16-bit value field is compared with the 16-bit packet data pointed to by the pointer (i.e., the isolated word) at the originating node of the arc. The 8-bit next_node field is the node at which the arc terminates. The 8-bit distance field is the number of bytes offset (i.e., distance) from the current position of the pointer. In other words, the distance field is the number of bytes that the pointer is incremented to point to the next 16-bit word to be isolated at the next node. The 8-bit distance field is encoded in 2's complement format: therefore, the distance value may vary from −128 bytes to +127 bytes.

DDG Node Record

Each node includes an associated record that defines a default arc, an action and the records associated with each arc originating from that node. For simplicity and in conformity with the link layer header format, each node record has four associated arcs. It is understood, however, that each node may have more or fewer associated arcs.

In the disclosed embodiment, if more than five arcs are required to originate from a node, then the default node is used as intermediate node for transition to other nodes. The data structure of each node record supported by the packet parser of the present invention is shown in table II below.

TABLE II

| Default arc | Default_Next_Node[7:0] | | Default_Distance[7:0] | |
| --- | --- | --- | --- | --- |
| Actions | Instr1[7:0] | | Instr2[7:0] | |
| Arc record 1 | Cmp Operand1[15:0] | Operand2[15:0] | NEXT NODE[7:0] | DISTANCE [7:0] |
| Arc record 2 | Cmp Operand1[15:0] | Operand2[15:0] | NEXT NODE[7:0] | DISTANCE [7:0] |

TABLE II-continued

| Arc record 3 | Cmp | Operand1[15:0] | Operand2[15:0] | NEXT NODE[7:0] | DISTANCE [7:0] |
| Arc record 4 | Cmp | Operand1[15:0] | Operand2[15:0] | NEXT NODE[7:0] | DISTANCE [7:0] |

Default arc is the arc that is used in the paring process if no match is found between the data being parsed and any of the comparison values associated with the four arcs originating from that node. The 8-bit Default_Next_Node specifies the node that is transitioned to via the default arc. The 8-bit Default_Distance specifies the distance between the current node and the Default_Next_Node. The 1-bit cmp field in conjunction with the 16-bit fields Operand1 and Operand2 are used to define the type of comparison that is made at each associated arc. A masked comparison is made if the following logic operation is true, in which case cmp is set to 0:

current_word&operand1=operand2 where current_word is the data being parsed, and symbol & operand represents a bit-wise AND operation. A range comparison is made if the following logic operation is true in which case cmp is set to 1:

(current_word>=Operand1)&&
(current_word<=Operand2)

where symbol>=indicates a greater than or equal to operation. The 8-bit Instr1 specifies the instruction corresponding to the first action associated with the node and the 8-bit Instr2 specifies the instruction corresponding to the second action associated with the node (see the Appendix describing the action processor). Arc records 1-4 define the records associated with the four arcs originating from that node. Shown below in a table format are the description of the parameters listed in Table II and described above.

TABLE III

| | |
|---|---|
| Default_Next_Node | If none of the 4 condition arcs finds a match, the parser will take the default arc. This field specifies the next node id for the default case |
| Default Distance | The distance to the next decision field on the default arc |
| Cmp | Type of Comparison:<br>0:Mask matching: if ((current_word & operand1) ==operand2) then take this arc<br>1: Range matching: if ((current word >= Operand 1) && (current_word <= Operand2) then take this arc |
| Operand 1 | The first operand to be used by the comparison operation, the type of comparison is selected by the "Cmp" field |
| Operand2 | The second operand to be used by the comparison operation, the type of comparison is selected by the "Cmp" field |
| Instr1 | DDG supports two actions per node.<br>Instr1 specifies the instruction for the first action |
| Instr2 | Instr2 specifies the instruction for the first action |
| Arc Record 1..4 | Defines 4 conditional arcs. The Arc record data structure is defined in the previous section. |

In accordance with the present invention, at each node the parser may carry out the action specified either by the first instruction Instr1 or the second instruction Instr2. Such instructions may correspond to the application that the parser is adapted for. Typical example of the parser instructions include "assert flags", "extract data field", "set interrupt flag", "send packet to special queue". For example, if an application requires the parser to recognize all Ethernet Bridge PDUs and send them to a special CPU queue, the parser is adapted to recognize the packet format of the Ethernet Bridge PDUs. The DDG node record associated with such an example includes instructions (not shown) that trigger the action of sending the packet to the CPU queue.

DDG Encoding Scheme

The DDG is represented as an array of DDG node records as shown in Table IV below:

TABLE IV

| |
|---|
| Node Record 0 |
| Node Record 1 |
| . . . |
| Node Record N-1 |

Because in this exemplary embodiment, each node is represented by an 8-bit field, the parser supports up to 256 nodes. Its is understood that more nodes may be supported by increasing the number of bits of the Next_Node field (see Table I above).

Figure 3A:
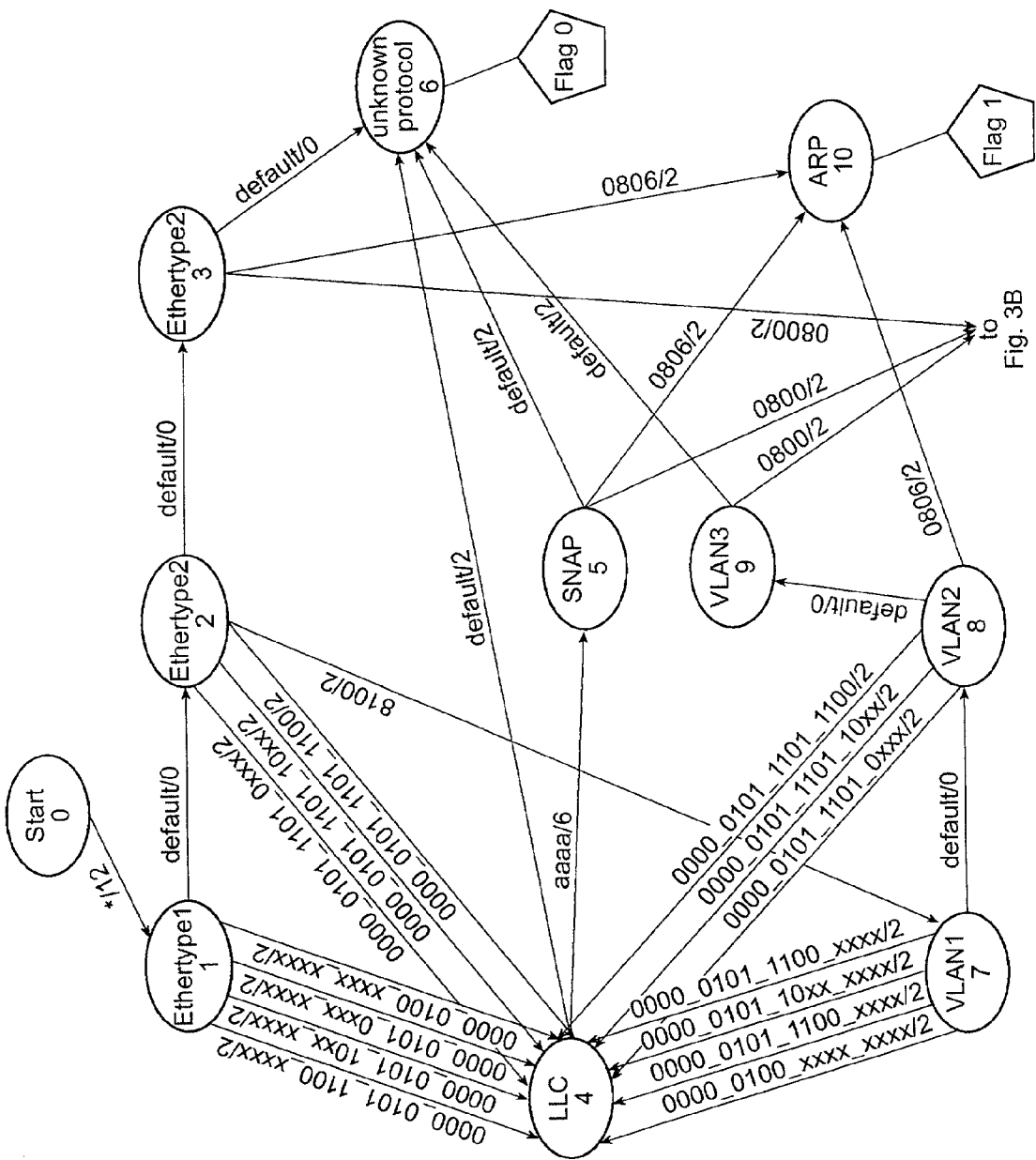
FIGS. 3A and 3B together form a directed distance graph of the transitions that a packet parser, in accordance with another embodiment of the present invention, is adapted to make when parsing a packet formed in accordance with an IP over Ethernet protocol.
Figure 3B:
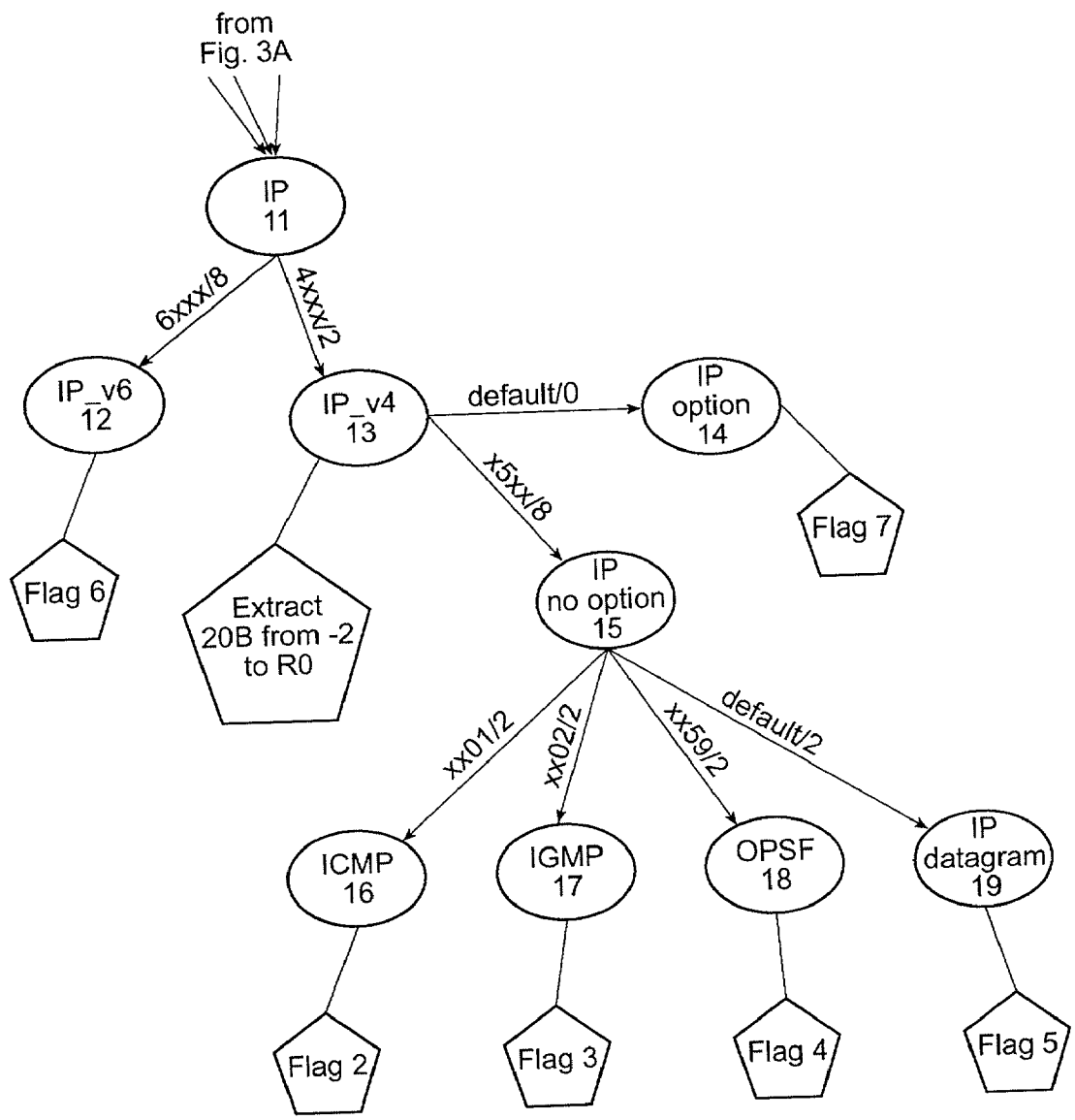

FIGS. 3A and 3B illustrate the DDG nodes and arcs that the packet parser may sequence through as it parses packets associated with an Ethernet/IP/TCP protocol. FIGS. 3A and 3B are similar to FIG. 2 except that FIGS. 3A and 3B incorporate the DDG encoding scheme described above and with the assumption that the cmp field describe above in Table II is 0 (i.e., no range comparison is performed) for all node records. As in FIG. 2, each node in FIGS. 3A and 3B is represented by an oval with a name corresponding to the parsing state which that oval represents. The parser initiates the parsing process at node start and terminates it after it reaches any of the end nodes ICMP, IGMP, OSPF and IP datagram. Disposed between the Start and End nodes are the internal nodes, each of which represents a parsing state.

Associated with and displayed above each arc connecting one internal node to another internal node is a pair of numbers separated by a slash. The first number is compared with the packet word isolated at the node from which the arc originates from. The second number represents the number of bytes offset that the pointer is incremented with at the end node of the arc. The default nodes and arcs are used in places where more than five arcs are required to represent the possible transitions from the arcs' originating node. For example, in FIGS. 3A and 3B, two default nodes Ethertype2 and Ethertype3 are used to enable implementation of the multitude of compare and branch operations required for the first two bytes—with byte offset of 12—immediately after the Start node. Table V below shows in a tabular format the DDG of FIGS. 3A and 3B.

TABLE V

| Node ID | MNEMONIC | Def nxt | Def dist | Instr1 | Instr2 | Arc1 cond | Arc1 nxt | Arc1 dist | Arc2 cond | Arc2 nxt | Arc2 dist |
|---|---|---|---|---|---|---|---|---|---|---|---|
| 0 | Start | 1 | 12 | NOP | NOP | | | | | | |
| 1 | Ethertype1 | 2 | 0 | NOP | NOP | 0000_0101_1100_xxxx | 4 | 2 | 0000_0101_10xx_xxxx | 4 | 2 |
| 2 | Ethertype2 | 3 | 0 | NOP | NOP | 0000_0101_1101_0xxx | 4 | 2 | 0000_0101_1101_10xx | 4 | 2 |
| 3 | Ethertype3 | 6 | 0 | NOP | NOP | 'h0800 | 11 | 2 | 'h0806 | 10 | 2 |
| 4 | LLC | 6 | 2 | NOP | NOP | 'haaaa | 5 | 6 | | | |
| 5 | SNAP | 6 | 2 | NOP | NOP | 'h0800 | 11 | 2 | 'h0806 | 10 | 2 |
| 6 | UNKNOWN | 6 | 0 | Stop | Flag0 | | | | | | |
| 7 | VLAN1 | 8 | 0 | NOP | NOP | 0000_0101_1100_xxxx | 4 | 2 | 0000_0101_10xx_xxxx | 4 | 2 |
| 8 | VLAN2 | 9 | 0 | NOP | NOP | 0000_0101_1101_0xxx | 4 | 2 | 0000_0101_1101_10xx | 4 | 2 |
| 9 | VLAN3 | 6 | 0 | NOP | NOP | 'h0800 | 11 | 2 | | | |
| 10 | ARP | 10 | 0 | stop | Flag1 | | | | | | |
| 11 | IP | 6 | 2 | NOP | NOP | 'h6xxx | 12 | 8 | 'h4xxx | 13 | 2 |
| 12 | IP_V6 | 12 | 0 | Stop | Flag6 | | | | | | |
| 13 | IP_V4 | 14 | 0 | Flag8 | Extr Tcpip | 'hx5xx | 15 | 8 | | | |
| 14 | IP_OPTION | 14 | 0 | stop | Flag7 | | | | | | |
| 15 | IP_NO_OPT | 19 | 2 | NOP | NOP | 'hxx01 | 16 | 2 | 'hxx02 | 17 | 2 |
| 16 | ICMP | 16 | 0 | stop | Flag2 | | | | | | |
| 17 | IGMP | 17 | 0 | stop | Flag3 | | | | | | |
| 18 | OSPF | 18 | 0 | stop | Flag4 | | | | | | |
| 19 | IP_DATA | 19 | 0 | stop | Flag5 | | | | | | |

| Node ID | MNEMONIC | Arc3 cond | Arc3 next | Arc3 dist | Arc4 cond | Arc4 next | Arc4 dist |
|---|---|---|---|---|---|---|---|
| 0 | Start | | | | | | |
| 1 | Ethertype1 | 0000_0101_0xxx_xxxx | 4 | 2 | 0000_0100_xxxx_xxxx | 4 | 2 |
| 2 | Ethertype2 | 0000_0101_1101_1100 | 4 | 2 | 'h8100 | 7 | 2 |
| 3 | Ethertype3 | | | | | | |
| 4 | LLC | | | | | | |
| 5 | SNAP | | | | | | |
| 6 | UNKNOWN | | | | | | |
| 7 | VLAN1 | 0000_0101_0xxx_xxxx | 4 | 2 | 0000_0100_xxxx_xxxx | 4 | 2 |
| 8 | VLAN2 | 0000_0101_1101_1100 | 4 | 2 | 'h0806 | 10 | 2 |
| 9 | VLAN3 | | | | | | |
| 10 | ARP | | | | | | |
| 11 | IP | | | | | | |
| 12 | IP_V6 | | | | | | |
| 13 | IP_V4 | | | | | | |
| 14 | IP_OPTION | | | | | | |
| 15 | IP_NO_OPT | 'hxx59 | 18 | 2 | | | |
| 16 | ICMP | | | | | | |
| 17 | IGMP | | | | | | |
| 18 | OSPF | | | | | | |
| 19 | IP_DATA | | | | | | |

Parser Hardware Architecture

Figure 4:
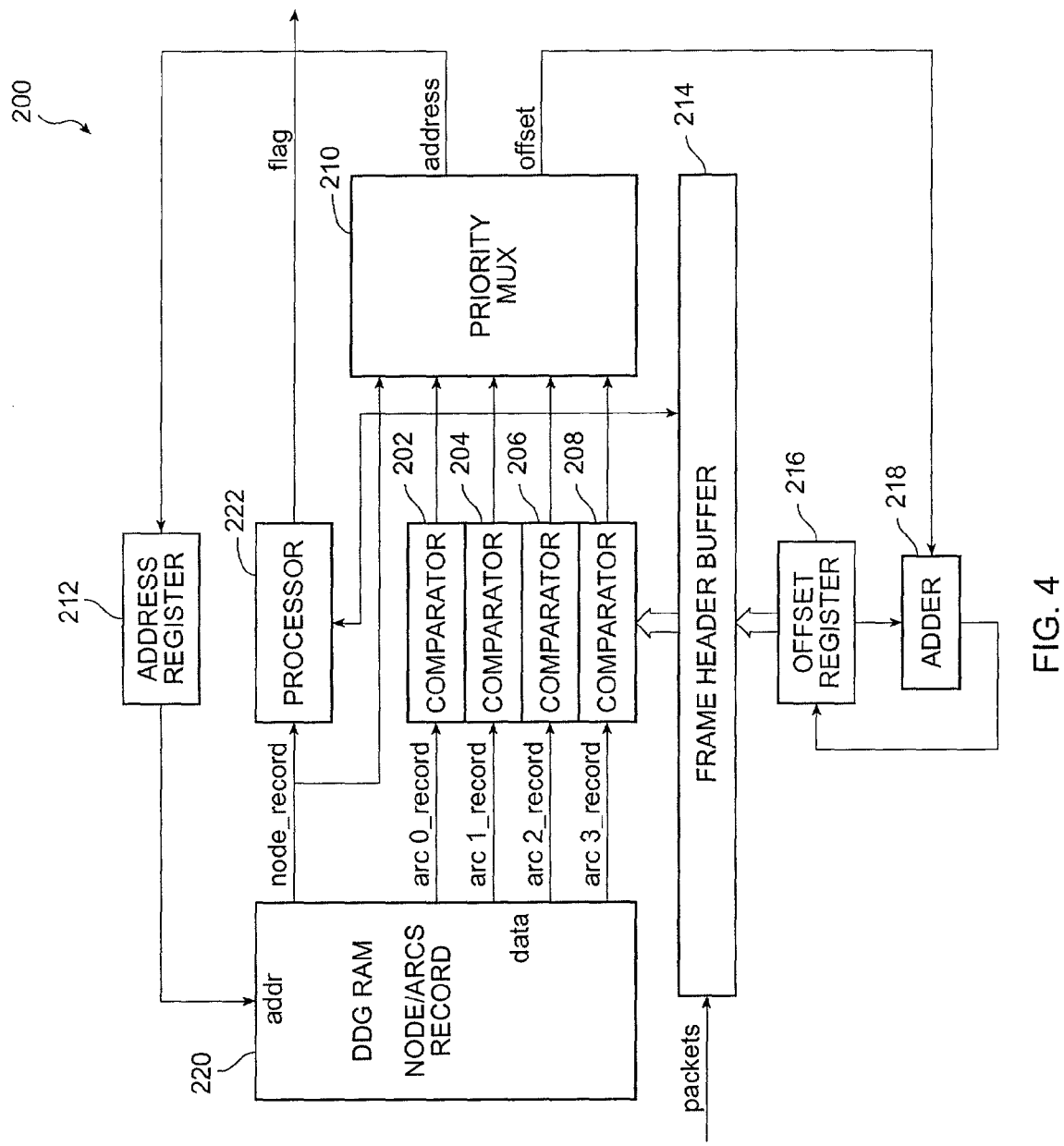
FIG. 4 is a simplified block diagram of a packet parser, in accordance with one embodiment of the present invention.

FIG. 4 is a simplified block diagram of a packet parser 200 in accordance with one embodiment of the present invention. Packet parser 200 includes, in part, comparators 202, 204, 206, 208, priority mux 210, address register 212, frame header buffer 214, offset register 216, added 218, Random Access Memory (RAM) 220, and processor 222.

Bytes associated with the header section of incoming packets are initially stored in frame header buffer 214. The parsing begins after all the bytes disposed in the packet header are stored in frame header buffer 214.

Node and arc record arrays associated with supported network protocol layers and their corresponding fields are stored in and retrieved from RAM 220. The node records are supplied by RAM 220 to processor 222 via signal node_record. The arc records are supplied by RAM 220 to comparators 202, 204, 206 and 208 respectively via signals arc0_record, arc1_record, arc2_record and arc3_record. The address locations where arc and node records associated with a header or a header field are stored are provided to RAM 220 via state register 212.

Offset register 216 is a sliding pointer, pointing to the byte offset position of the packet header field being processed. The sliding pointer of offset register 216 enables packet parser 200 to spend multiple parsing cycles on the same header field if needed. The sliding pointer skips packet header fields that are otherwise not required for parsing. Offset register 212 is initially loaded with data to point to the first offset position of the packet header bytes being parsed.

Comparators 202, 204, 206 and 208 perform two functions. First, if so required, they perform bitwise AND operations on the arc records they retrieve from RAM 220. Thereafter, they compare the retrieved records with the header bytes that they receive from frame header buffer 214.

Comparators 202, 204, 206 and 208 perform their respective operations in parallel so as to increase the parsing speed. It is understood that each of comparators 202, 204, 206 and 208 may perform masked comparison or range comparison, as determined by the control word cmp. It is also understood that in other embodiments, the packet parser may have more or fewer than four comparators.

Priority mux 210 prioritizes the results of the operations carried out by masked comparators 202, 204, 206 and 208, in the event more than one match is found. Priority mux 210 also receives node_record signal retrieved from RAM 220. Priority mux 210 determines both the next address that is read from RAM 220 and the byte offset that the sliding pointer of the offset register points to during the next parsing state. The address of the next location to be read from RAM 220 is stored in address register 212. The byte offset identifies the number of bytes that is advanced from the current position of the packet header so as to point to the next packet byte to be isolated. The offset is supplied to adder 218, which adds the current offset position it receives from priority mux 210 to the previous offset position that it receives from offset register 216 to determine the position of the next offset in the packet header. In other words, as a result of the add operation performed by adder 218, the sliding pointer in offset register 216 is incremented to point to the next packet header—stored in frame header buffer 214—to be isolated for parsing. If the distance between any two nodes is less than 0, the parser may rewind the pointer for further processing of the packet.

Processor 222 executes the instructions associated with node records retrieved from RAM 220. For example, if the packet being parsed is associated with SNAP encoded LLC, the node_record corresponding to that data causes processor 222 to generate a flag signal. Appendix A, includes a brief description of and an associated instruction set of an exemplary embodiment of processor 222.

Figure 5:
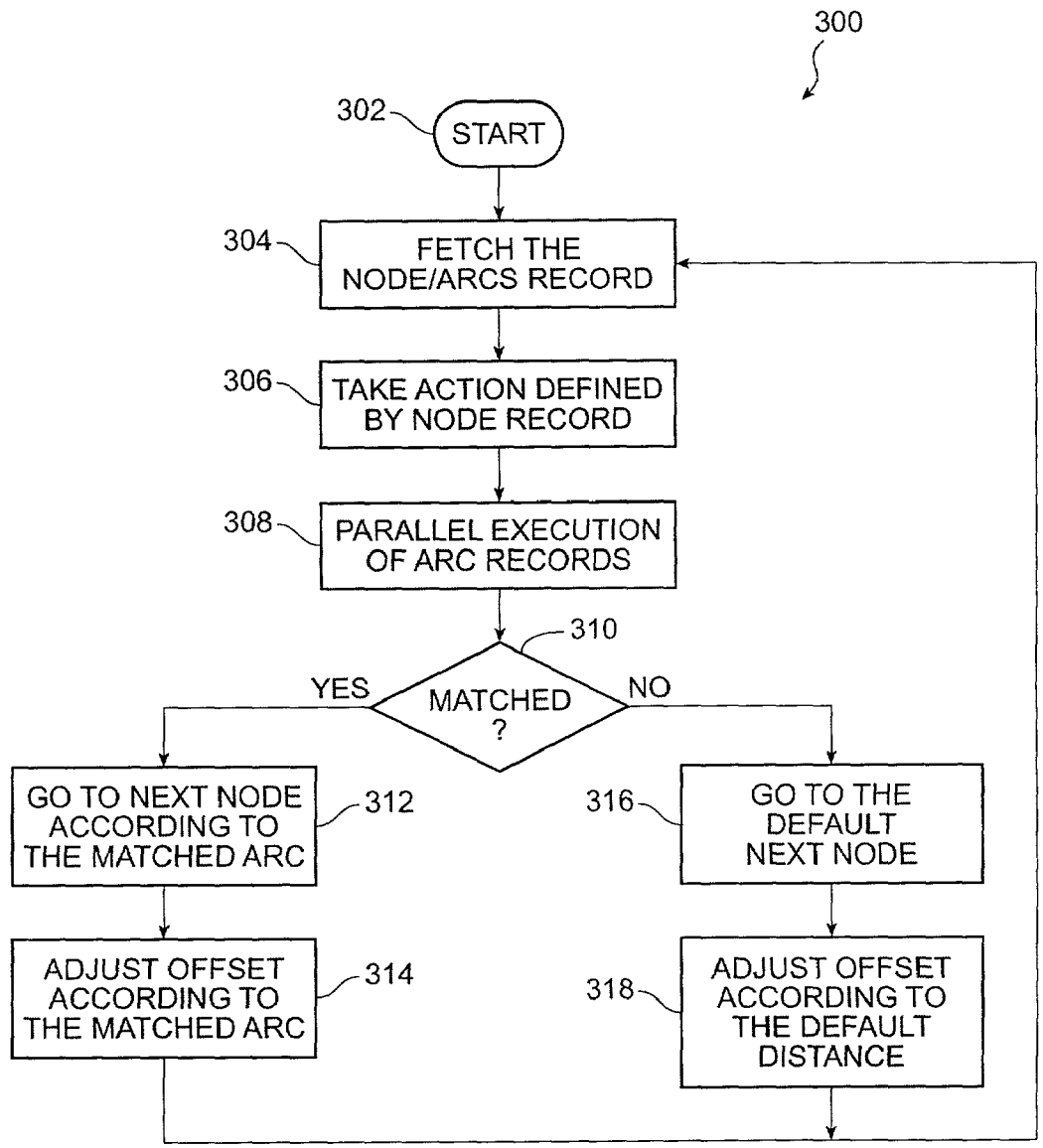
FIG. 5 is a flow chart illustrating steps performed by the packet parser of FIG. 4.

FIG. 5 is a flow chart 300 indicating, in part, the steps performed by packet parser 200 in parsing a packet. At step 302, the bytes forming the header section of an incoming packet are received causing the parsing operation to begin. At step 304 records associated with the first group of header bytes are retrieved. Any instruction specified by the node record is executed at step 306. Next, at step 308, four parallel bit-wise AND and compare operations are performed.

Step 310 is performed after step 308. If, at step 310, a match is found between any of the arc records and the header bytes being parsed, the process moves to step 312. At step 312, data associated with the next node, determined by the matched record as identified in step 312, is retrieved. Thereafter, at step 314, the next header offset associated with the matched arc is identified. The header offset points to the next header bytes that are parsed. The process subsequently moves to step 304 at which step the parsing cycle is repeated until all the header bytes disposed in the packet are processed.

If, at step 310, no match is found between any of the arc records and the header bytes being parsed, the process moves to step 316. At step 316, data associated with a default node is retrieved. Thereafter, at step 318 a default header offset associated with the selected default node is also selected. The process subsequently moves to step 304 at which step the parsing cycle is repeated until all the header bytes disposed in the packet are processed.

The above embodiments of the present invention are illustrative and not limiting. The invention is not limited by the number of bytes that is parsed at each node or by the number of arcs originating from each node. Nor is the invention limited by the constraint of any other field, such as the number or type of instruction, associated with each node or arc record structure of the present invention. The invention is not limited by the number or type of encapsulation format used in generating packets parsed by the present invention. Nor is the invention limited by the type of integrated circuit in which the packet parser of the present invention may be disposed. For example, the packet parser of the present invention may be implemented by a programmable logic device, or state machine. In other embodiments the present invention may be implemented by software code executed by a central processing unit. Other additions, subtractions or modifications are obvious in view of the present invention and are intended to fall within the scope of the appended claims.

APPENDIX A

Action Processor and Instruction Set

The Generic Packet Parser (GPP) defines two types of actions: notification and extraction. Each DDG node can be associated with up to two actions. The following provides a reference definition for the instruction set.

| Instruction Set | | |
|---|---|---|
| Instruction code | Mnemonic | Description |
| 0 | NOP | No operation |
| 1 | STOP | Terminate parsing |
| 2 | EXTR_IP_TCP | Extract IP and TCP header into the TCP/IP header records |
| 2 . . . 33 | FLAG0 . . . FLAG31 | The action block has 32 flag registers. Each instruction asserts one of the flags. This may be used to identify protocols such as: UNKNOW, ARP, IPV6, IPV4, IP_OPTION, IP_NOOPTION, ICMP, IGMP, OSPF, IP_NORMAL, TCP, UDP . . . These flags may be used to tag the packet to identify protocols that requires special processing |
| 34..255 | RESERVED | Reserved |

The action processor executes the instructions in the node records. The following diagram illustrates the hardware structure:

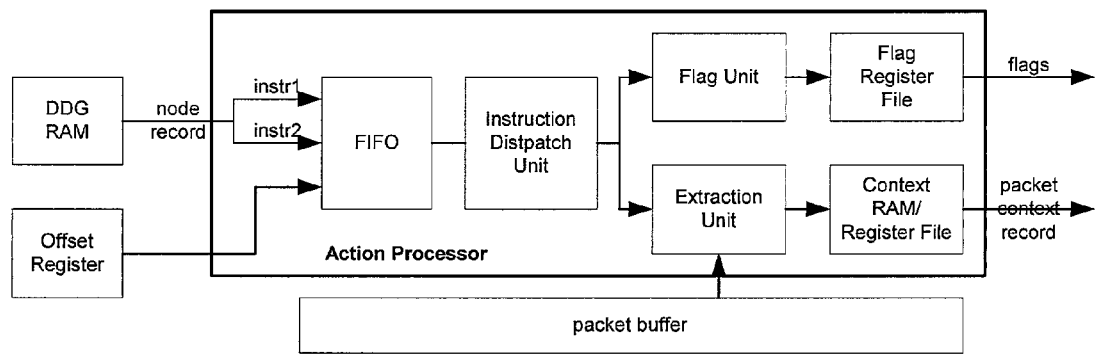

APPENDIX A

The Instruction FIFO holds pending instructions. Each FIFO element has two instruction slots plus one offset slot. Up to two instructions from the node record may be launched into the instruction FIFO at each parsing step. The value of the offset register is sampled and saved along with the instruction slot. In one parsing step, if both instruction slots in the node record contain NOP (no operation), no instruction is written into the instruction FIFO.

In the current proposal, there are two concurrent execution units in the action processor: the flag unit and the extraction unit. More execution units may be added according to future requirements. The flag unit maintains the flag register file. The flag unit modifies flags in the register file according to the instruction decode result. The Extraction unit performs field extractions according to the instruction and the offset value saved in the FIFO slot.

The dispatch unit does preliminary decoding of both instructions in a slot and dispatches the instructions to the appropriate unit. Some instructions may take multiple cycles to complete. The dispatch unit may stall for multi-cycle instructions or when there is a resource conflicts between two instructions. The instruction FIFO is intended to absorb the variation in processing cycles and schedule the executions of instructions overtime. When the Instruction FIFO fills up, the parsing engine may stall as a result of back pressuring. For optimal performance, it is recommended that the user allocate the first instruction slot in the node record for flag operations, and the second instruction for extraction operations.

What is claimed is:

1. A packet parser comprising:
   logic circuitry adapted to receive a first portion of a control information disposed in a packet being parsed and to transition from a first state to a second state if the first portion of the control information matches a first criteria associated with the first state;
   logic circuitry adapted to receive a second portion of the control information disposed in the packet and to transition from the second state to a third state if the second portion of the control information matches a second criteria associated with the second state;
   logic circuitry adapted to receive a third portion of the control information disposed in the packet and to transition from the first state to the third state if the first portion of the control information disposed in the packet matches a third criteria associated with the first state;
   an offset register that is incremented if a transition from the first state to any of the second and third states is made;
   logic circuitry adapted to transition from the first state to a default state if the first portion of the control information disposed in the packet does not match any one of the criteria associated with the first state;
   logic circuitry adapted to transition from said default state to a fourth state;
   a processor adapted to execute at least one instruction at one or more of the first, second, third, fourth and default states; wherein said processor is adapted to set a flag at one or more of the first, second, third, fourth and default states;
   a memory coupled to the processor and adapted to store records associated with each parsing state and records associated with each transition originating from each parsing state; and
   a plurality of comparators each coupled to the memory and each adapted to receive a record associated with a different one of the transitions originating from each parsing state.

2. The packet parser of claim 1 further comprising:
   a buffer coupled to the comparators and the offset register and adapted to store the control information disposed in the packet.

3. The packet parser of claim 1 further wherein at least one of the plurality of comparators performs a masked comparison to generate a Boolean result.

4. The packet parser of claim 2 further wherein at least one of the plurality of comparators performs a range comparison to generate a Boolean result.

5. The packet parser of claim 3 further comprising:
   a priority mux adapted to receive the Boolean result generated by each of the plurality of comparators and to select the Boolean result having a highest priority if more than one comparator generates a true result, said priority mux adapted to determine the address of the next records in the memory.

6. The packet parser of claim 4 further comprising:
   a priority mux adapted to receive the Boolean result generated by each of the plurality of comparators and to select the Boolean result having a highest priority if more than one comparator generates a true result, said priority mux adapted to determine the address of the next records in the memory.

* * * * *